US012722667B2

(12) United States Patent
Mohr

(10) Patent No.: US 12,722,667 B2
(45) Date of Patent: Sep. 1, 2026

(54) CABLE CAR AND CABLE CAR NETWORK WITH SEVERAL CABLE CARS

(71) Applicant: Innova Patent GmbH, Wolfurt (AT)

(72) Inventor: Clemens Mohr, Wolfurt (AT)

(73) Assignee: INNOVA PATENT GMBH, Wolfurt (AT)

( * ) Notice: Subject to any disclaimer, the term of this patent is extended or adjusted under 35 U.S.C. 154(b) by 641 days.

(21) Appl. No.: 18/299,326

(22) Filed: Apr. 12, 2023

(65) Prior Publication Data

US 2023/0322281 A1 Oct. 12, 2023

(30) Foreign Application Priority Data

Apr. 12, 2022 (AT) .............................. A 50238/2022

(51) Int. Cl.
*B61B 11/00* (2006.01)
*B61B 12/00* (2006.01)
*H02J 4/00* (2006.01)

(52) U.S. Cl.
CPC ............ *B61B 11/00* (2013.01); *B61B 12/002* (2013.01); *H02J 4/00* (2013.01); *B61L 2201/00* (2013.01)

(58) Field of Classification Search
CPC ...... B61L 1/00; B61L 3/00; B61L 3/02; B61L 2201/00; B61B 11/00; B61B 12/002; B61B 12/00; B61B 7/00; B61B 7/04; H02J 4/00
USPC ...... 104/88.02, 88.01; 105/149.1, 149.2, 148
See application file for complete search history.

(56) References Cited

U.S. PATENT DOCUMENTS 8,910,578 B2 * 12/2014 Gubler .................. B61L 23/002 104/173.1
9,135,217 B2 9/2015 Stauner et al.

FOREIGN PATENT DOCUMENTS

| | | | |
|---|---|---|---|
| CN | 105774822 | A | 7/2016 |
| CN | 106132799 | A | 11/2016 |
| DE | 102010029115 | A1 | 11/2011 |
| DE | 102014007548 | A1 | 11/2015 |
| EP | 2803550 | A1 | 11/2014 |
| JP | 2010221822 | A | * 10/2010 |
| JP | 2015224013 | A | 12/2015 |
| JP | 2020-083234 | A | 6/2020 |

(Continued)

OTHER PUBLICATIONS

Search Report dated Jan. 13, 2023 for Austrian Patent Application No. A 50238/2022.

(Continued)

*Primary Examiner* — S. Joseph Morano
*Assistant Examiner* — Heaven R Buffington
(74) *Attorney, Agent, or Firm* — Husch Blackwell LLP

(57) ABSTRACT

A cable car and a cable car network with cable car stations and cable car vehicles movable with a haulage rope between the cable car stations includes a cable car control unit for controlling the cable car, wherein a maximum electrical energy consumption of the cable car is predetermined; an energy detection unit configured for determining an electrical energy consumption of the cable car; and wherein the cable car control unit is configured to control or regulate an electrical energy consumption of at least one electrical consumer of the cable car based at least in part on the determined electrical energy consumption of the cable car such that the maximum electrical energy consumption predetermined for the cable car is not exceeded. Associated (Continued)

methods of operating a cable car or cable car network are also disclosed.

20 Claims, 1 Drawing Sheet

(56) References Cited

FOREIGN PATENT DOCUMENTS

| | | | |
|---|---|---|---|
| WO | 2011003812 | A2 | 1/2011 |
| WO | 2018177686 | A2 | 10/2018 |

OTHER PUBLICATIONS

Chinese Office Action issued on Jul. 19, 2025 in Chinese Application No. 202310383656.5.
European Search Report dated Aug. 28, 2023 for European Application No. 23167188.4.
Machine Translation of JP2015224013A.
Machine Translation of JP2010221822A.
Machine Translation of CN105774822A.
Machine Translation of WO2011003812A2.

* cited by examiner

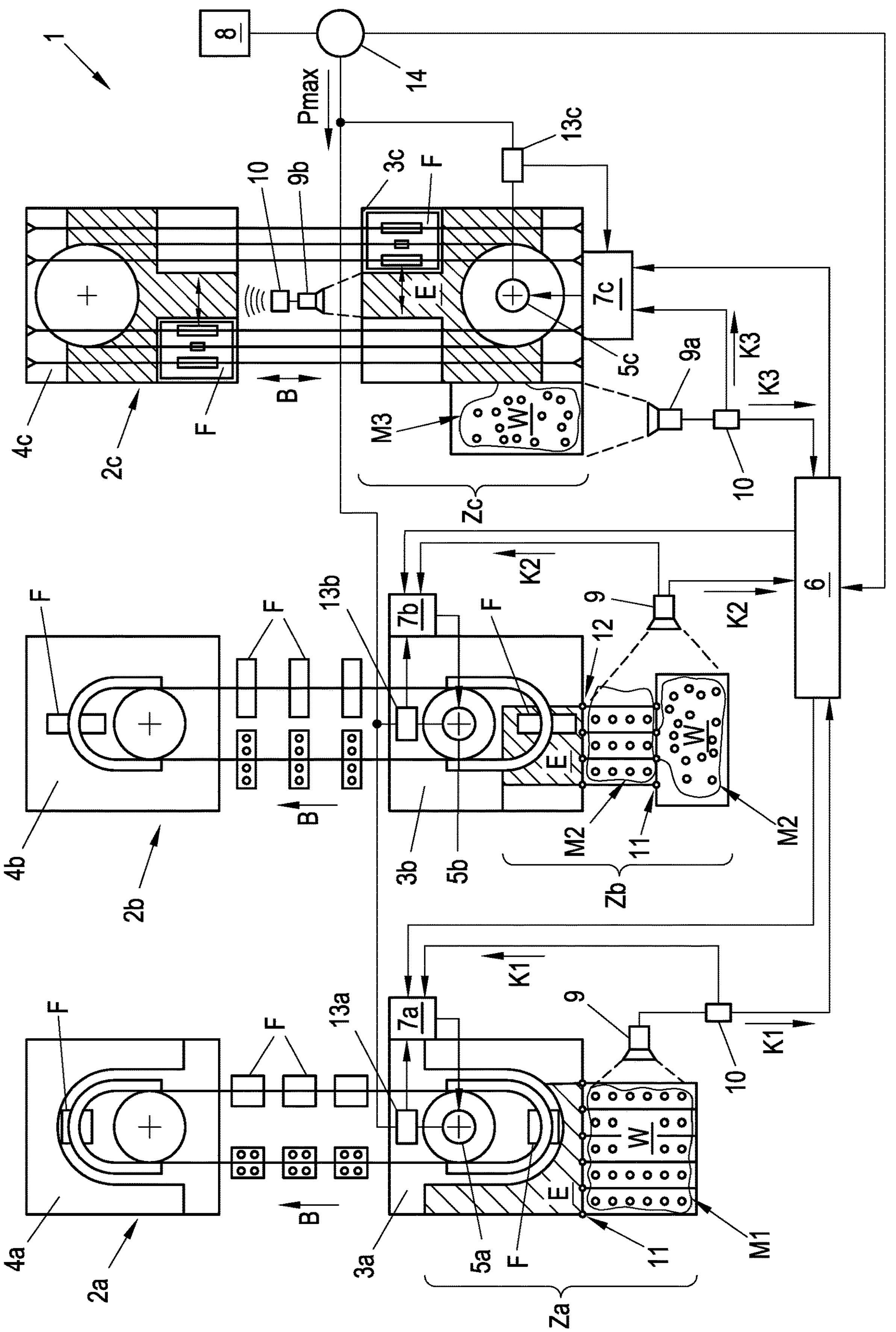
1
8
14
Pmax
13c
3c
F
10
9b
E
7c
5c
9a
K3
K3
B
M3
W
4c
2c
F
10
Zc
6
K2
K2
9
12
13b
7b
F
E
W
M2
11
M2
Zb
4b
2b
B
3b
5b
K1
K1
9
10
13a
7a
F
W
E
11
M1
4a
2a
B
3a
5a
F
Za

CABLE CAR AND CABLE CAR NETWORK WITH SEVERAL CABLE CARS

CROSS REFERENCE

This application claims priority to Austrian Patent Application No. A50238/2022 filed on 12 Apr. 2022, the disclosure of which is incorporated herein by reference in its entirety.

TECHNICAL FIELD

The present disclosure relates to a cable car having a number of cable car stations and a number of cable car vehicles which are movable between the cable car stations by means of a haulage rope, wherein a cable car control unit is provided for controlling the cable car. The present disclosure also relates to a cable car network having a plurality of cable cars, each having a number of cable car stations and a number of cable cars movable between the cable car stations. The present disclosure further relates to methods for operating a cable car and a cable car network.

BACKGROUND

In winter sports areas, there are usually several cable cars, often operated by one operator. The individual cable cars are usually controlled independently of one another via a cable car control unit provided in the respective cable car. The control is usually provided from a cable car control room, which is usually provided in a cable car station. The cable cars vehicles of the cable cars are usually moved at a conveyor speed that is defined for the respective cable car and is usually constant. The conveyor speed depends on the type of cable car and therefore varies naturally. In a circulating cable car, the cable cars are moved between two or more cable car stations by means of a haulage rope in a circulating loop.

The conveyor speed on the free section is determined by the speed of the haulage rope. Within a circulating cable car station, the cable cars vehicles can usually be decoupled from the haulage rope and moved through the cable car station at reduced conveyor speed. A suitable auxiliary drive is usually provided to move the decoupled cable car vehicles. Movement within the cable car station is also usually at a fixed and usually constant conveyor speed. A change of the conveyor speed is generally not intended and is performed at most for safety reasons. For example, the conveyor speed is reduced, if a person falls in the boarding area, due to weather conditions or for technical reasons. The reduction of the conveyor speed is usually performed manually by the operating personnel.

In aerial cable cars, the cable car vehicles are not moved in a circulating loop, but are moved back and forth between the cable car stations in an oscillating motion. Here, the conveyor speed is naturally reduced when the cable car vehicles reach the cable car station and then reduced to a standstill. On the free section between the cable car stations, however, the cable car vehicles usually move at a fixed, constant conveyor speed.

In addition to the drive device for driving the cable car vehicles, there are usually a series of other electrical consumers in cable cars that have to be supplied with power during operation. Again, all consumers are usually operated at a constant electrical power.

It is therefore an object of the present disclosure to provide a cable car and a cable car network that enable more efficient operation.

SUMMARY

The object is solved with the above-mentioned cable car in that a maximum value for an electrical energy consumption of the cable car is specified, preferably in the form of a maximum power or a maximum amount of energy, in that an energy determination unit is provided for determining a variable representative of the electrical energy consumption of the cable car, and in that the cable car control unit is designed to control or regulate the electrical energy consumption of at least one electrical consumer of the cable car depending on the determined variable in such a manner that the maximum value for the electrical energy consumption predetermined for the cable car is not exceeded. For economic reasons, it is generally desirable to keep the energy consumption of the cable cars in a cable car network as low as possible, particularly against the background of rising energy costs. For ecological reasons, too, it is fundamentally desirable to keep energy consumption as low as possible, particularly if the energy does not come exclusively from renewable sources.

In the present disclosure, this is made possible by specifying a maximum value and controlling the electrical consumer accordingly, wherein preferably, of course, a plurality of consumers is controlled. Until now, this was neither possible nor desirable, because cable cars were generally connected to the public power grid and were not subject to any restrictions in terms of energy consumption. The variable representative of an electrical energy consumption of the cable car can be, for example, a current electrical power which is used for the operation of the cable car. The determination unit could thereby comprise, for example, at least one current measuring device for measuring the electric current and at least one voltage measuring device for measuring the electric voltage. From current and voltage, the determination unit can calculate the electrical power. If the voltage is known, only the current can be measured. However, the determination unit could also comprise a power measuring device with which the power can be measured directly. However, the determination unit could also have an energy meter, for example, with which the energy consumption can be recorded, for example in kWh.

The cable car is preferably connected to an electrical power source by which the maximum value is fixed. Additionally or alternatively, a maximum electrical power consumption of the cable car, e.g. a sum of electrical nominal powers of the number of consumers, may be greater than the specified maximum value. This allows the available amount of energy or power to be limited and the cable car to adjust the energy consumption to the limited amount of energy or power accordingly. For example, the cable car control unit can reduce the power of individual consumers to ensure that the maximum value is not exceeded, which is necessary, for example, if the maximum possible energy consumption of the cable car would exceed the specified maximum value. If, for example, a maximum amount of energy is specified as the maximum value, then the cable car control unit can also plan the energy consumption in advance in such a manner that the maximum value is not exceeded, e.g., by switching off individual consumers or reducing the power accordingly.

Preferably, the at least one electrical consumer comprises one of the following consumers: a drive device for driving the cable car vehicles, a heating device for heating the cable car vehicles, an air conditioning device, a lightning, a conveyor belt for conveying people, a door operating device for opening/closing cabin doors of cable car vehicles. This allows the most substantial consumers of a cable car to be taken into account when controlling energy consumption. For example, to control energy consumption, the cable car control unit can change a drive power of the drive device, preferably by changing a conveyor speed of the cable car vehicles, and/or change a heating power of the heating device, and/or change a set temperature of the air conditioning device, and/or change a drive power of the conveyor belt, preferably by changing a conveyor speed, and/or change a frequency of an activation of the door actuation device. If, for example, it is determined that the determined quantity of the current energy consumption, for example an electrical power, exceeds the specified maximum value, then the conveyor speed of the cable car vehicles can be reduced, for example, in such a manner that the maximum value is no longer exceeded.

A prioritization value may be specified for each of a plurality of electrical consumers, and the cable car control unit may take the prioritization values into account when controlling the plurality of electrical consumers. This makes it possible to consider the importance of individual consumers. The energy consumption of consumers that are less important for cable car operation, for example the seat heating of a chair car, can then be reduced earlier, if necessary, than the energy consumption of consumers that are more important for cable car operation, for example the drive device of the cable car.

Preferably, a people detection device is provided in at least one cable car station of the cable car, which is designed to determine a characteristic variable representative of a crowd in an access area of the respective cable car station, preferably continuously or intermittently, during operation of the cable car. The cable car control unit is designed to control the electrical energy consumption of the at least one consumer as a function of the characteristic variable determined at a specified time or in a specified period during operation or a variable derived therefrom. This makes it possible that the capacity utilization of the cable car is automatically taken into account when controlling energy consumption. For example, if a characteristic variable is determined that is representative of a small number of people, then the cable car control unit can respond and reduce energy consumption. A possibility for this would be, for example, a reduction of the conveyor speed, since in the case of a low capacity utilization the maximum conveyor capacity of the cable car is not necessary. The characteristic variable can be processed in real time, for example, such that the current crowd is taken into account when controlling.

If, on the basis of the characteristic variable determined, it is detected that there are no more people in the access area, then the drive device could also be stopped completely (at least temporarily), for example. In the case of a seat car, for example, any conveyor belt that may be present could also be stopped. In a cable car station, a remote door actuation device could also be provided to selectively open and close the car doors of the cars within a cable car station. In this case, for example, the doors could not be opened, if no persons were detected. For example, the characteristic variable could be recorded continuously and an average value could be determined over a certain specified period of time and used for control. The characteristic variable could also be determined intermittently, i.e. discretely in time at determined intervals, wherein the characteristic variable determined in each case can be used directly for control. A variable derived from the characteristic variable, e.g. a change in the characteristic variable over time or the aforementioned average value, could also be used for control.

At this point it should be noted that the use of the people detection device does not necessarily have to be accompanied by the specification of the maximum value. Control of the cable car based on the characteristic variable determined by the people detection device can in principle also be provided on its own, i.e. without being restricted by a predetermined maximum value.

For example, at least a threshold value can be predetermined and the cable car control unit can reduce the electrical energy consumption of the at least one electrical consumer, if the determined characteristic variable or the variable derived therefrom falls below the predetermined threshold value. The cable car control unit can increase the electrical energy consumption again, if the determined characteristic variable or the variable derived from it reaches or exceeds the predetermined threshold value again. Of course, several threshold values can also be predetermined and the reduction or increase of the electrical energy consumption can take place in steps. This is particularly advantageous for electrical consumers whose electrical consumption depends on the number of passengers transported, such as the drive device.

It can also be advantageous, if a function for determining a nominal value of a variable, representative of the electrical energy consumption, is predetermined for the at least one electrical consumer as a function of the characteristic variable or the variable derived therefrom, and in that the cable car control unit determines a nominal value of the variable, representative of the electrical energy consumption, on the basis of the characteristic variable determined by the people detection device or the variable derived therefrom by using the function and controls the at least one electrical consumer on the basis of the determined nominal value. The function can be stored in the cable car control unit, for example, as a characteristic curve or characteristic map. Several functions can also be specified for several electrical consumers, e.g., in order to take into account different dependencies on the characteristic variable. This allows the electrical power of individual consumers to be changed, in particular reduced, for example, at different values of the characteristic variable.

A control unit can also be provided, which is designed to determine a correcting variable from the determined nominal value and an actual value determined for the at least one consumer and to control the at least one consumer with the correcting variable. This allows the at least one consumer to be controlled to the determined nominal value. To determine the actual value, for example, a separate measuring unit can be provided with which a suitable electrical variable of the consumer can be detected, e.g., electrical current or electrical power.

Preferably, the people detection device has at least one sensor unit for detecting a sensor variable in the access area and an evaluation unit that is designed to determine the characteristic variable from the sensor variable. The evaluation unit can also be integrated in the sensor unit or be integrated in the cable car control unit. Particularly preferably, the sensor unit has a camera, for example a 3D camera or thermal imaging camera, or at least one light barrier or microphone or WLAN network or RFID antenna or at least one of the following sensors: pressure sensor, scale, movement sensor. At least one of said sensors preferably has a piezo sensor, ultrasonic sensor, infrared sensor, $CO_2$ sensor, or contact switch. This creates different ways in which the characteristic variable can be determined. For example, the sensor unit can continuously sense the sensor variable and the evaluation unit can sample the sensed sensor variable to determine the characteristic variable in continuous or discrete time steps.

The access area may also have a boarding area for people to board the cable car vehicles and a waiting area for people to queue, wherein the boarding area and the waiting area may be separated by a ticket control barrier. In this case, the people detection device can be designed to determine the characteristic variable in the boarding area and/or in the waiting area. This allows for the fact that different types of cable cars may have crowds at different locations. While crowding usually occurs directly in the boarding area when cabin cars are operating at high capacity, this is often the case with seat cars in front of the access control barrier or between the access control barrier and automatic access barriers, which are usually provided just before the boarding area.

The characteristic variable representative of the crowd in the access area is preferably one of the following: number of people, volume, area of crowd, pressure, weight, $CO_2$ concentration, number of sensor signals. The variable derived from the characteristic variable can be a time average value of the characteristic variable over a fixed period of time or a change in the characteristic variable over time. The nature of the characteristic variable is highly dependent on the sensors used in the people detection device.

The object is further solved with the above-mentioned cable car network in that a cable car network control unit is provided for controlling the cable car network, in that a maximum value for a total electrical energy consumption of the cable car network is predetermined, preferably in the form of a maximum power or maximum amount of energy, in that a total energy determination unit is provided for determining a value representative of a total electrical energy consumption of the cable car network, representative of a total electrical energy consumption of the cable car network, and in that the cable car network control unit is designed to control the electrical energy consumption of at least one cable car of the cable car network as a function of the determined variable in such a manner that the predetermined maximum value for the total electrical energy consumption of the cable car network is not exceeded. In this manner, more efficient operation can also be achieved in a cable car network by controlling the energy consumption of the individual cable cars, particularly the electrical consumers provided therein, as a function of the specified maximum value. Preferably, the at least one cable car is designed according to one of the claims 1 to 13 and the cable car network control unit determines the maximum value for the electrical energy consumption of the individual cable cars from the predetermined maximum value for the total electrical energy consumption of the cable car network and transmits this as a default to the cable car control units of the cable cars. Particularly preferably, of course, all cable cars of the cable car network are designed according to any of claims 1 to 13.

The cable cars of the cable car network can be connected to a common electrical energy source, which determines the predetermined maximum value for the total electrical energy consumption of the cable car network. Alternatively or additionally, a sum of the maximum electrical energy consumptions of the cable cars, e.g. the sum of the nominal powers of the electrical consumers of the cable cars, can also be greater than the maximum value for the total electrical energy consumption specified for the cable car network. This can substantially perform an optimal load distribution. This may mean, for example, that not all cable cars can be operated at their nominal power because this would exceed the specified maximum value. However, the cable car network control unit can reduce the power of the consumers of the majority of the cable cars accordingly in such a manner that the maximum value is not exceeded.

For example, a prioritization value can also be specified for each of a plurality of cable cars in the cable car network, and the cable car network control unit can take the prioritization values into account when controlling the electrical energy consumption of the cable cars. This means, for example, that the energy consumption of a cable car that is less important for the operation of the entire cable car network, e.g. a relatively remote cable car with usually less passenger traffic, can be reduced earlier than the energy consumption of a cable car that is more important in the cable car network.

BRIEF DESCRIPTION OF THE DRAWINGS

Reference is now made more particularly to the drawings, which illustrate the best presently known mode of carrying out the disclosure and wherein similar reference characters indicate the same parts throughout all views.

FIG. 1 shows an embodiment of cable car network with three cable cars according to an embodiment of the present disclosure.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. The following definitions and non-limiting guidelines must be considered in reviewing the description of the technology set forth herein.

The headings (such as "Background" and "Summary") and sub-headings used herein are intended only for general organization of topics within the present disclosure and are not intended to limit the disclosure of the technology or any aspect thereof. In particular, subject matter disclosed in the "Introduction" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

The citation of references herein does not constitute an admission that those references are prior art or have any relevance to the patentability of the technology disclosed herein. All references cited in the "Description" section of this specification are hereby incorporated by reference in their entirety.

The description and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the apparatus and systems of this technology and, unless explicitly stated otherwise, are not intended to be a representation that given embodiments of this technology have, or have not, been made or tested.

"A" and "an" as used herein indicate "at least one" of the item is present; a plurality of such items may be present, when possible. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. In addition, disclosure of ranges includes disclosure of all distinct values and further divided ranges within the entire range. FIG. 1 shows a schematic diagram of a cable car network 1 with three cable cars 2*a*-2*c*. Each cable car 2*a*-2*c* has, by way of example, a first cable car station 3*a*-3*c* and a second cable car station 4*a*-4*c*. The cable cars 2*a*-2*c* each have a number of cable car vehicles F that are movable by a haulage rope between the first cable car station 3*a*-3*c* and the second cable car station 4*a*-4*c*. For example, the first cable car stations 3*a*-3*c* can be valley stations in a ski resort and the second cable car stations 4*a*-4*c* can be mountain stations. Passengers are thus transported mainly (but not exclusively) from the valley station 3*a*-3*c* to the mountain station 4*a*-4*c*. The cable cars 2*a*-2*c* are designed differently here as an example, but could of course also be of the same type.

The first cable car 2*a* is exemplarily designed as a circulating cable car in the form of a cabin car, wherein the cable car vehicles have cabins for accommodating a number of people. The second cable car 2*b* is exemplarily designed as a circulating cable car in the form of a chair car, wherein the cable car vehicles F have seat cars for accommodating a number of people. The third cable car 2*c* is exemplarily designed as an aerial cable car, wherein the cable car vehicles also have cabins for accommodating a number of people. The capacity of the cabins of an arial cable car is usually much higher than the capacity of the cabins of a circulating cable car and the capacity of the cabins circulating cable car is usually much higher than the capacity of the chairs of a chair car. In a circulating cable car, a plurality of cable car vehicles F are usually moved in a continuously circulating direction of movement B, as indicated by the arrows of the cable cars 2*a*, 2*b* pointing in one direction only. In an aerial cable car, usually only two cable car vehicles F are provided (one cable car vehicle per direction) and the cable car vehicles F are moved back and forth between the cable car stations 3*c*, 4*c* in an oscillating movement direction B, as indicated by the arrow in the third cable car 2*c* pointing in opposite directions.

Each cable car 2*a*-2*c* also has a number of electrical consumers, for example at least one drive device 5*a*-5*c* each for driving the cable car vehicles F. Each cable car 2*a*-2*c* also has a cable car control unit 7*a*-7*c* for controlling the electrical consumers. The cable car control units 7*a*-7*c* each have suitable hardware and/or software and are connected to the electrical consumers via suitable communication connections. The drive devices 5*a*-5*c* may each have, for example, an electric machine for driving a sheave around which the conveyor rope is looped. In the case of circulating cable cars, here the cable cars 2*a*+2*b*, the cable car vehicles F can generally be uncoupled from the conveyor rope in the cable car stations 3*a*+3*b*, 4*a*+4*b* and moved through the respective cable car station 3*a*+3*b*, 4*a*+4*b* at reduced speed by means of an auxiliary drive (not shown). In this case, the drive devices 5*a*+5*b* can also be designed to drive the auxiliary drives.

In addition to the drive device 5*a*-5*c*, a number of other electrical consumers may be provided, but these have not been shown for the sake of clarity. In addition to the drive devices 5*a*-5*c*, which consume a large part of the energy, the electrical consumers also include, for example, a heating device for heating the cable car vehicles F, e.g. a seat heater in the case of the chair car 2*b*, or an air-conditioning device for controlling the temperature (heating and/or cooling) of interior spaces of the cable car stations 3*a*-3*c* or 4*a*-4*c*. Other electrical consumers include, for example, lighting inside or outside the cable car stations 3*a*-3*c* or 4*a*-4*c*, a conveyor belt for conveying passengers in the boarding area E of a cable car station 3*b* of the seat car 2*b*, or a remote-controlled door actuation device for opening/closing cabin doors of cable car vehicles F.

A first aspect of the present disclosure relates to a cable car and is described in more detail below, by way of example, with reference to the first cable car 2*a*. Where appropriate, reference is also made to the second cable car 2*b* as well as the third cable car 2*c*. Of course, the cable cars 2*b*+2*c* can also be designed according to the present disclosure. Thereafter, a second aspect of the present disclosure is described in more detail with reference to the cable car network 1 as a whole.

In the first cable car 2*a*, an energy determination unit 13*a* is provided for determining a quantity representative of an electrical energy consumption of the cable car 2*a*. The energy detection unit 13*a* may, for example, be arranged in an electrical supply line through which the entire cable car 2*a* is supplied with electrical energy. However, the energy detection unit 13*a* could in principle also be designed to detect only the energy consumption of the drive device 5*a*, which may be sufficient under certain circumstances if the drive device 5*a* is decisive for the overall energy consumption of the cable car 2*a*. The cable car 2*a* is connected to a power source 8, for example to the public power grid or a separate, e.g. self-sufficient, power source. Of course, the cable car 2*a* can also be connected to a common power source 8 together with other cable cars 2*b*+2*c*, as shown in FIG. 1.

In the context of the present disclosure, a maximum value is predetermined for the electrical energy consumption of the cable car 2*a*, and the cable car control units 7*a* are designed to control the electrical energy consumption of the at least one electrical consumer, preferably a plurality of consumers, of the cable car 2*a* as a function of the quantity determined by the energy determination unit 13*a* in such a manner that the maximum value predetermined for the cable car 2*a* is not exceeded. Here, as an example, the energy detection unit 13*a* is arranged in the supply line of the drive device 5*a* and connected to the cable car control unit 7*a* to transmit the detected quantity to the cable car control unit 7*a*, which is indicated by the arrow. Of course, this arrangement is only exemplary and substantially depends on the type of energy detection unit 13*a* used.

The energy detection unit 13*a* may have, for example, a current measurement unit for measuring the electric current, and the determined quantity representative of the energy consumption may be, for example, the actual current. However, the determined quantity, which is representative for the energy consumption, could also be a current electrical power, for example. This can be determined by the energy detection unit 13*a* from the measured current and the electrical voltage. The electrical voltage can either be known or could also be detected, for example, by means of a voltage measuring unit not shown. However, the energy detection unit 13*a* could also have a power measurement unit for directly measuring electrical power. For example, a maximum electrical power could be specified as the maximum value, and the cable car control unit 7*a* can control the electrical consumers (e.g., the drive unit 5*a*) as a function of the determined current electrical power in such a manner that the maximum value is not exceeded. For example, the power of individual electrical consumers of the cable car 2*a* could be reduced to comply with the maximum value.

As noted at the outset, however, the energy detection unit 13*a* could also have an energy meter that can be used to directly measure energy consumption within a fixed unit of time, e.g. since the start of operation, for example in kWh. For example, a maximum value could be specified as a maximum amount of energy, e.g. a fixed amount of energy per day or week.

For example, a suitable control unit may also be provided in the cable car 2*a*, which may have one or more controllers. By means of the control unit, a correcting variable for controlling the electrical consumer(s) can be determined from the maximum value specified for the cable car 2*a*, for example a maximum power, and the variable determined by the energy detection unit 13*a*, for example a current power. However, different operating modes can also be implemented in the cable car control unit 7*a*, for example, each of which is assigned to a specific energy consumption. In the operating modes, for example, different powers of individual electrical consumers can be defined or, if necessary, also time sequences of electrical powers. Different operating modes for different maximum energy amounts may also be specified, ensuring that the respective specified maximum energy amount is not exceeded.

For example, a prioritization value may also be determined for each of a plurality of determined electrical consumers, and the cable car control unit 7*a* may take the prioritization values into account when controlling the plurality of electrical consumers. By assigning prioritization values, it is possible to determine, for example, how important the operation of a particular consumer is for maintaining the operation of cable car 2*a*. A high prioritization value can mean that the assigned load has a relatively high importance, such that its power is preferably not reduced, reduced only slightly, or reduced rather late. An example of an electrical consumer with a high prioritization value could be the drive device 5*a*. A low prioritization value, on the other hand, can mean that the assigned load has a relatively low importance, such that its power can be reduced rather early and, if necessary, down to zero, without this having a significant effect on the operation of the cable car 2*a*. An example of an electrical consumer with a low prioritization value could be, for example, the seat heating of the seat vehicles F of a seat car. Prioritization values could be assigned, for example, between zero and ten, wherein zero could mean that complete shutdown is permissible even during operation and ten could mean that a reduction in the power of the assigned load is impermissible.

As mentioned above, the cable car 2*a* is connected to an electrical power source 8. The specified maximum value could now also be defined by the energy source 8 itself, for example. This may mean, for example, that the energy source 8 can only provide a limited maximum electrical power Pmax or that the amount of energy available from the energy source 8 is limited. Consequently, the cable car control unit 7*a* can control the electrical consumers of the cable car 2*a* in such a manner that the maximum power Pmax or the maximum amount of energy of the energy source 8 is not exceeded.

A maximum electrical energy consumption of the cable car 2*a* can also be greater than the specified maximum value. For example, a sum of the nominal powers of the electrical consumers could be greater than the maximum available power Pmax of the energy source 8. In this case, not all consumers of the cable car 2*a* can be operated with the maximum nominal power. The cable car control unit 7*a* controls the consumers of the cable car 2*a* accordingly in such a manner that the power of individual or all consumers is reduced such that the maximum value is not exceeded. The selection of the load(s) whose power is reduced at all or first can be determined by the operating modes and the prioritization values.

To control energy consumption, the cable car control unit 7*a* can, for example, change a drive power of the drive device 5*a*, which can preferably be done by changing, in particular reducing, a conveyor speed of the cable car vehicles F. Furthermore, for example, a heating output of the heating device, e.g. the seat heating of the seat vehicles, could be changed and/or a set temperature of the air conditioning device could be changed. A drive power of the conveyor belt could also be changed, preferably by changing a conveyor belt speed. Furthermore, if a remote door actuation device is provided, then a frequency of activation could be changed, for example. In particular, the doors of the cable car vehicles could remain partially closed, which is preferably done when using the people detection device described in more detail below.

In at least one cable car station 3*a* of the cable car 2*a* (in FIG. 1, for example, in the valley station), a people detection device is preferably provided which is designed to determine, preferably continuously or intermittently, a characteristic variable K1 representative of a crowd of people M1 in an access area Za of the cable car station 3*a* during operation of the cable car 2*a*. The cable car control unit 7*a* can control the electrical energy consumption of the consumers of the cable car 2*a* in dependence on determined characteristic variable K1 or a variable derived therefrom, which was determined at a fixed time or in a fixed period during operation. This allows a current capacity utilization of the cable car 2*a* to be taken into account when controlling the electrical consumers. For example, by reducing the conveyor speed of the cable car vehicles F, the required drive power of the drive device 5*a* can be reduced, resulting in lower energy consumption. The same applies, of course, to the other electrical consumers, whose power can be reduced as a function of the determined characteristic variables K1. Electrical consumers that are not absolutely necessary for operation could, for example, also be switched off completely (at least temporarily).

The characteristic variable K1 can, for example, be determined continuously, i.e. permanently, during the operation of the cable car 2*a*, and the processing of the characteristic variable K1 and the control of the electrical consumers can also be performed continuously, e.g. in real time, by the cable car control unit 7*a*. However, the determination of the characteristic variable K1 and/or the control of the consumers by the cable car control unit 7*a* could also take place intermittently, i.e. only at certain points in time or discretely in time, during operation. For example, the characteristic variable K1 could be determined continuously and the cable car control unit 7*a* can use the characteristic variable K1 determined at fixed times to control the consumers. However, the characteristic variable K1 could also be determined only at certain fixed time intervals and the value determined in each case could be used by the cable car control unit 7*a* to control the consumers. As mentioned above, the characteristic variable K1 can be used directly by the cable car control unit 7*a* to control the consumers. Alternatively, a variable derived from the characteristic variable K1 could also be used for control, for example an average value of the characteristic variable K1 over a fixed period of time or a change in the characteristic variable K1 over time.

In the context of the application, the access area Za is to be understood as the entire area in which the passengers of the cable car 2*a* can be located from the time they enter the cable car station 3*a* until they board the cable car vehicles F. For example, the access area Za may have an entry area E for people to board the cable car vehicles F and a waiting area W for people to queue, wherein the entry area E and the waiting area W may be separated by a ticket control barrier 11. In the case of seat car 2*b*, an automatic barrier device 12 can also be provided in the waiting area W downstream of the ticket control barrier 11, which is arranged immediately upstream of the boarding area E and which serves to release and block access for passengers to the boarding area at specified times.

The people detection device can be designed to determine the characteristic variable K1 in the boarding area E and/or in the waiting area W. In the case of the seat car 2*b*, it can be advantageous if the characteristic variable K2 is determined in the waiting area W, because there is usually only a smaller number of people in the boarding area E, which corresponds at most to the number of available seats of the seats. In the case of the (circulating) cabin car 2*a*, where crowds can generally form both in the waiting area W (e.g. as indicated in FIG. 1 in front of the ticket control barrier 11) and in the boarding area E (after the ticket control barrier 11 and directly at the platform), a determination of the characteristic variable K2 can, for example, only take place in the waiting area W or only in the boarding area E. However, a determination for both areas would also be conceivable. In the case of the aerial cable car 2*c*, it can be advantageous to determine the characteristic variable K3 in the waiting area W because the boarding area E often also serves as the exit area and it may not be easy to separate boarding and alighting passengers.

In accordance with an advantageous embodiment, the people detection device has at least one sensor unit 9 for detecting a sensor variable and an evaluation unit 10, wherein the evaluation unit 10 is designed to determine the characteristic variable K1 from the sensor variable. The evaluation unit 10 can also be integrated directly in the sensor unit 9, but could also be integrated in the control unit 7*a* of the cable car 2*a*. In the example shown, the evaluation unit 10 is only exemplarily designed as a separate unit. The people detection device is connected to the cable car control unit 7*a* via a suitable communication connection to send the sensor variable or characteristic variable K1 to the cable car control unit 7*a*, as indicated by the arrow in FIG. 1. The communication connection may be designed to be wireless, or it may be wireless, as indicated on the evaluation unit 10 in the third cable car 2*c*. For example, the characteristic variable K1 representative of the crowd M1 in the access area Za may be one of the following: number of people, volume, area of crowd, pressure, weight, $CO_2$ concentration, number of sensor signals. The size used substantially depends on the specific design of the people detection device, as will be explained in more detail below.

Advantageously, the sensor unit 9 has a camera, for example a 3D camera or thermal imaging camera, for capturing a number of images, as indicated in FIG. 1. In the first cable car 2*a*, the camera is arranged to detect a crowd M1 in the waiting area W of the access area Za. In the second cable car 2*b*, the camera is arranged to capture a crowd M2 in the waiting area W of the access area Zb before and after the ticket control barrier 11. In the third cable car 2*c*, two sensors 9*a*, 9*b* in the form of cameras are provided as an example, wherein a first sensor unit 9*a* is arranged in such a manner that a crowd M3 in the waiting area W of the access area Zc can be detected, and a second sensor unit 9*b* is arranged in such a manner that a crowd in the boarding area E of the access area Zc can be detected.

An image recognition algorithm implemented in the evaluation unit 10 can be used to determine the characteristic variable K1 from the images captured by the camera. Again, this can be done continuously or at discrete points in time. Image recognition algorithms are basically known in the prior art, which is why no detailed description is given here. In a simple embodiment, for example, a surface occupied by a crowd M1 in a captured image could be used as a characteristic variable K1. If a thermal imaging camera is used, the number of people, for example, could be determined by means of the image recognition algorithm and used as characteristic variable K1.

A sensor unit 9 can alternatively also have at least one light barrier, a microphone, a WLAN network or an RFID antenna. A sensor unit 9 may also have at least one of the following sensors: pressure sensor, scale, movement sensor, wherein at least one sensor preferably has one of the following sensors: Piezo sensor, infrared sensor, ultrasonic sensor, $CO_2$ sensor, contact switch. For example, a plurality of pressure sensors or contact switches could be arranged, e.g., in a grid-like arrangement, in the floor of the access area Za. A number of sensor signals could be used as a characteristic variable K1 for the crowd M1 in the access area Za. This substantially means that the more people the crowd M1 has, the more sensor signals are generated.

However, a scale could also be arranged in the floor of an access area Z1, for example, with which the total weight of the people in the access area Z1 can be measured. The measured weight could then be used as a measure of the number of people and thus as a characteristic variable K1 representative of the crowd M1 in the access area Za.

A movement detector, which could be provided in a relatively narrow passageway of the access area Za, for example, could be used to directly count the number of people passing through the passageway. For example, a movement detector could be provided at each ticket control barrier 11. Alternatively, the ticket control barrier 11 itself, e.g. a ticket reader or a turnstile, could be used as a sensor unit 9 to count the number of people passing through the ticket control barrier 11. A light barrier could also be provided in the access area Za, for example again in the area of a ticket control barrier 11, to determine the number of people. The determined number of people could then be used as a representative characteristic variable K1 for the crowd M1 in the access area Za. Based on the determined number of people, the evaluation unit 10 could, for example, also determine a number of people in a fixed time unit and use it as characteristic variable K1. An average value of the determined number of people over a specified period of time can also be used for control of energy consumption.

A light curtain consisting of several parallel light barriers could also be used, or a light grid consisting of several intersecting light barriers. In this regard, the light curtain or light grid could be located in a plane substantially parallel to the floor of the access area Za and could be designed to cover a defined surface in the access area Za to detect people located therein. For example, the number of interrupted light barriers of the light process or light grid could be used as a representative characteristic variable K1 for the crowd M1 in the access area Za.

A microphone could be used to determine the volume in the, preferably closed, access area Za and the volume could be used as a representative characteristic variable K1 for the crowd M1 in the access area Za. In the closed access area Za, a $CO_2$ concentration could in principle also be measured by means of a $CO_2$ sensor and used as a representative characteristic variable K1 for the crowd Ma in the access area Z1.

Tickets often contain an RFID transponder (also called an RFID tag) and ticket control barriers 11 often have an RFID reader. By checking the tickets, it is thus possible to count people at the same time and to use the number of people as a characteristic variable K1. Similarly, the characteristic variable K1 could be determined using an available WLAN network within a cable car station 3*a*. Almost every passenger nowadays carries a smartphone, which usually also has a WLAN antenna to enable it to manufacture a connection to a WLAN network. Often the WLAN antennas are permanently activated to automatically show the user an available WLAN. The WLAN network could thus be used to determine a number of activated WLAN antennas that are in the reception range of the WLAN network (even if they are not actively logged into the WLAN network). The determined number can be used directly as characteristic variable K1 or could be used to determine characteristic variable K1.

From this it can be seen that there are many different ways in which a characteristic variable K1 representative of the crowd M1 in the access area Za can be determined, from which the person skilled in the art can select a suitable one.

For the characteristic variable K1 of the cable car 2*a* (or the variable derived therefrom), for example, a threshold value can also be predetermined, and the cable car control unit 7*a* can reduce the energy consumption of the consumers of the cable car 2*a* if the characteristic variable K1 (or the variable derived therefrom) determined by the people detection device falls below the predetermined threshold value. The reduction of energy consumption can be achieved, as mentioned above, by reducing the power of the available electrical consumers, for example by reducing the conveyor speed, switching off a heating device, lowering the illumination level, etc. As long as the energy consumption falls below the threshold value, the cable car 2*a* can be operated with a specified reduced energy consumption, for example with a specified lower conveyor speed. If the characteristic variable K1 determined by the people detection device reaches or exceeds the predetermined threshold value again, the cable car control unit 7*a* can increase the energy consumption again, e.g. by increasing the conveyor speed. Of course, a hysteresis function can also be stored in order to avoid an undesired rapid reduction and increase.

Of course, several threshold values can also be predetermined and the cable car control unit 7*a* can reduce the energy consumption of the cable car 2*a* in steps, if the energy consumption falls below the threshold values, or increase it again in steps, if the energy consumption exceeds the threshold values.

For one or more electrical consumers, a function for determining a nominal value for a variable representative of the energy consumption as a function of the characteristic variables K1 could also be provided. The cable car control unit 7*a* can then determine a nominal value, for example a nominal value for the power or current of an electrical consumer such as the drive device 5*a*, on the basis of the characteristic variable K1 determined by the people detection device by means of the function, and control or regulate the consumer on the basis of the determined nominal value. In this case, the reduction or increase in energy consumption, e.g. by changing the conveyor speed, can be done steplessly, for example. In a simple embodiment, the function could be, for example, a straight line function with a fixed slope. Of course, more complex functions would also be possible. Instead of the drive power, an equivalent quantity such as the conveyor speed or the electric current can of course also be used. There could also be a separate function for each available electrical consumer (or one or more of the thresholds described above). By selecting the functions accordingly, it may be possible, for example, to reduce the power of less important consumers earlier or, if necessary, to switch them off completely.

The functions can, for example, be stored in the form of characteristic diagrams or characteristic curves in the cable car control unit 7*a*. A suitable control unit could also be provided, which is designed to determine a correcting variable from the nominal value determined for a consumer and an actual value determined for the at least one consumer and to control the at least one consumer with the correcting variable. For example, a nominal value for the drive power or current of the drive unit could be determined from the function, and a current actual value of the drive power or current could be determined. By means of a suitable controller implemented in the control unit, a suitable correcting variable could be determined and the drive device 5*a* can be controlled with the correcting variable. To detect the actual value, a suitable detection unit could be provided, for example, with which the electrical power or an equivalent quantity, such as the current, can be detected.

At this point, it should be mentioned once again that the features described with reference to the first cable car 2*a* can, of course, also be provided in an analogous manner in the second cable car 2*b* (=seat car) and in the third cable car 2*c* (=aerial cable car), as indicated by the reference numerals shown in FIG. 1 (cable car control unit 7*b*+7*c*, energy detection unit 13*b*+13*c*, access area Zb+Zc, sensors 9, evaluation unit 10, characteristic variable K2+K3, crowd M2+M3, etc.). Different types of characteristic variables can also be used for different types of cable cars 2*a*-2*c*, for example, when different people detection devices are used that have different sensor units 9. For example, one or more threshold values can be used for each type of characteristic variable. For example, if a crowd weight is used as a characteristic variable, a different threshold is naturally used than if the number of people in the crowd is used as a characteristic variable.

A second aspect of the present disclosure is described in more detail below. The second aspect relates to the control of the entire cable car network 1, which has a plurality of cable cars 2*a*-2*c*. In the cable car network 1, a cable car network control unit 6 is provided for joint control of the cable cars 2*a*-2*c*, in particular the electrical consumers already described in detail. The cable car network control unit 6 is shown schematically and centrally in FIG. 1 as an example and can in principle be arranged at any suitable location in the cable car network 1. The cable car network control unit 6 may, for example, be located in one of the cable car stations 3*a*-3*c*, 4*a*-4*c* or, for example, in a (not shown) central control room, which may be located somewhere else than the cable cars 2*a*-2*c*.

The cable car network control unit 6 has suitable hardware and/or software and is connected to the cable cars 2a-2c via a suitable communication connection. Preferably, separate cable car control units 7a-7c are provided in the individual cable cars 2a-2c for controlling the electrical consumers (drive devices 5a-5c, etc.). In this context, the cable car network control unit 6 is preferably designed to control the electrical consumers of the cable cars 2a-2c indirectly via the cable car control units 7a-7c. A direct connection to the electrical consumers would of course also be conceivable, e.g. if the cable cars 2a-2c do not have their own cable car control units 7a-7c.

Furthermore, a total energy determination unit 14 is provided in the cable car network 1 for determining a quantity representative of a total electrical energy consumption of the cable car network 1, and a maximum value for the total electrical energy consumption of the cable car network 1 is specified, preferably in the form of a maximum power Pmax or maximum amount of energy. The cable car network control unit 6 is designed to control the electrical energy consumption of the cable cars 2a-2c of the cable car network 1 as a function of the determined variable in such a manner that the predetermined maximum value for the total electrical energy consumption of the cable car network 1 is not exceeded. This means that energy management is not limited to just one cable car, as described above with reference to the first cable car 2a, but that the energy consumption of an entire cable car network 1 can be controlled centrally.

The cable cars 2a-2c of the cable car network 1 may also be designed as described with reference to cable car 2a, wherein each cable car 2a-2c has a separate cable car control unit 7a-7c and its own energy detection unit 13a-13c. In this case, the cable car network control unit 6 can determine the maximum value for the electrical energy consumption of the cable car network 1 from the specified maximum value for the electrical energy consumption of the cable cars 2a-2c and transmit it to the cable car control units 7a-7c. The cable car control units 7a-7c then control the electrical consumers of the associated cable car 2a-2c depending on the variables detected by the energy detection units 13a-13c respectively and the maximum values obtained. To determine the maximum values of the cable cars 2a-2c from the specified maximum value for the total electrical energy consumption of the cable car network 1, a suitable distribution key can be stored in the cable car network control unit 6, for example.

The cable cars 2a-2c of the cable car network 1 may also be connected to a common electrical energy source 8, which determines the predetermined maximum value for the total electrical energy consumption of the cable car network 1. This may mean, for example, that the common energy source 8 has a predetermined maximum power Pmax which cannot or should not be exceeded. The cable car network control unit 6 can then, for example, control the power of the cable cars 2a-2c in such a manner that the total power required to operate the cable car network 1 is below the specified maximum power Pmax. Alternatively or additionally to the maximum power Pmax, a maximum amount of energy could also be specified and the cable car network control unit 6 can control the cable car network 1 in such a manner that the maximum amount of energy is not exceeded. For this purpose, for example, a suitable energy saving plan can be stored in the cable car network control unit 6, which ensures that the maximum amount of energy is not exceeded at a determined point in time. For example, an amount of energy could be specified for a fixed period of time, e.g. a day or a week.

A sum of the maximum electrical energy consumptions of the cable cars 2a-2c can also be greater than the maximum value for the total electrical energy consumption specified for the cable car network 1. For example, a sum of the nominal powers of the available electrical consumers of the cable cars 2a-2c may be greater than the maximum power Pmax specified for the cable car network 1. This means that not all cable cars 2a-2c can be operated at the nominal power, but the cable car network control unit 6 can control the energy consumptions in such a manner that the maximum value is not exceeded. For example, individual cable cars 2i can be operated at significantly reduced power (up to complete deactivation), while other cable cars 2i are operated at nominal power. Or all cable cars 2i can be operated with reduced power, wherein the reduction does not have to be the same everywhere, of course. The cable car network control unit 6 can thus be used for optimal load distribution of the cable car network 1.

In order to prevent a reduction in energy consumption for individual particularly important cable cars 2i of the cable car network 1, prioritization values can be specified, for example, which can be taken into account by the cable car network control unit 6 when controlling the consumers of the cable cars 2i. For example, prioritization values between zero and ten could be specified, wherein a prioritization value of zero means that the assigned cable car 2i has the lowest importance and a prioritization value often means that the assigned cable car 2i has the highest importance. The cable car network control unit 6 can take the prioritization values into account, for example, by reducing the energy consumption of a cable car 2i with a low prioritization value earlier than the energy consumption of a cable car 2i with a high prioritization value. Similarly, different consumers of a cable car 2i could be assigned different prioritization values, as already described with reference to the first cable car 2a. The power of less important consumers, for example, could then be reduced earlier than the power of higher priority consumers. The prioritization values can, for example, be taken into account in the distribution key mentioned above.

Of course, it is particularly advantageous if a people detection device is provided in each of the cable cars 2a-2c, which is designed to determine, preferably continuously or intermittently, during operation of the respective cable car 2a-2c, a characteristic variable K1-K3 representative of a crowd of people M1-M3 in an access area Za-Zc of the respective cable car station 3a-3c. The cable car network control unit 6 can then control the electrical energy consumption of the cable cars 2a-2c as a function of the characteristic variable K1-K3 or a variable derived therefrom, which were determined at a specified time or in a specified period during operation. In this manner, the current capacity utilization of the cable cars 2a-2c can be automatically taken into account when controlling and the energy consumption can be reduced, particularly for those cable cars 2a-2c for which a low passenger volume is detected.

In this case, the evaluation units 10 of the people detection devices can be directly connected to the cable car network control unit 6 in order to send the sensor variables or the characteristic variables K1-K3 to the cable car network control unit 6. The communication connection may be designed to be wireless, or it may be wireless, as indicated on the evaluation unit 10 in the third cable car 2c. Of course, the evaluation units 10 could also be connected to the respective cable car control units 7a-7c to send the sensor variables or the characteristic variables K1-K3 to the cable car control unit 7a-7c, and the cable car control units 7a-7c could transmit the sensor variables or the characteristic variables K1-K3 to the higher-level cable car network control unit 6.

The people detection devices can of course be designed analogously, as described with reference to the first cable car 2*a*, wherein different sensor units 9 and different characteristic variables K1-K3 could of course also be provided. No repetition will be made at this point.

What is claimed is:

1. A cable car having a number of cable car stations and a number of cable car vehicles movable with a haulage rope between the cable car stations, comprising:

a cable car control unit configured for controlling the cable car, an energy detection unit configured for determining a characteristic parameter of an electrical energy consumption of the cable car;

wherein a maximum value for the energy consumption of the cable car is predetermined; and wherein the cable car control unit is configured to control or regulate an electrical energy consumption of at least one electrical consumer of the cable car based at least in part on the determined characteristic parameter of the electrical energy consumption of the cable car such that the predetermined maximum value for the electrical energy consumption of the cable car is not exceeded.

2. The cable car according to claim 1, further comprising an electric power source connected with the cable car and by which the maximum value of the electrical energy consumption is defined, and/or wherein a possible maximum electric energy consumption of the cable car is greater than the maximum value of the electrical energy consumption.

3. The cable car according to claim 1, wherein the at least one electrical consumer comprises at least one of the following electrical consumers: a drive device for driving the cable car vehicles, a heating device for heating the cable car vehicles, an air conditioning device, a lighting device, a conveyor belt for conveying people, or a door actuation device for opening/closing cabin doors of the cable car vehicles.

4. The cable car according to claim 3, wherein the cable car control unit is configured to control the electrical energy consumption of the at least one electrical consumer of the cable car by changing at least one of:

a drive power of the drive device;

a conveyor speed of the cable car vehicles;

a heating power of the heating device;

a set temperature of the air conditioning device;

a drive power of the conveyor belt; and a frequency of activation of the door actuation device in order to control the energy consumption.

5. The cable car according to claim 1, further comprising:

a plurality of electrical consumers and wherein each of the plurality of electrical consumers has a prioritization value, and wherein the cable car control unit is further configured to control or regulate the electrical energy consumption of each of the plurality of electrical consumers based at least in part on the prioritization value of each of the plurality of electrical consumers.

6. The cable car according to claim 1, further comprising:

a people detection device in at least one cable car station of the cable car, wherein the people detection device is configured to continuously or intermittently determine a characteristic variable of a crowd in an access area of the at least one cable car station during operation of the cable car; and wherein the cable car control unit is configured to control or regulate the electrical energy consumption of the at least one electrical consumer based at least in part on the characteristic variable of the crowd.

7. The cable car according to claim 6, wherein:

the cable car control unit is configured to reduce the electrical energy consumption of the at least one electrical consumer if the characteristic variable of the crowd falls below at least one predetermined threshold value; and wherein the cable car control unit is further configured to increase the electrical energy consumption of the at least one electrical consumer if the determined characteristic variable of the crowd reaches or exceeds the predetermined threshold value.

8. The cable car according to claim 6, wherein a function for determining a nominal value of a characteristic parameter of the electrical energy consumption for the at least one electrical consumer is determined based at least in part on the characteristic variable of the crowd, and wherein the cable car control unit is further configured to determine the nominal value of the characteristic parameter of the electrical energy consumption for the at least one electrical consumer based at least in part on the characteristic variable of the crowd by using the function for determining the nominal value of the characteristic parameter of the electrical energy consumption for the at least one electrical consumer and to control or regulate the electrical energy consumption of the at least one electrical consumer based at least in part on the determined nominal value of the characteristic parameter of the electrical energy consumption for the at least one electrical consumer.

9. The cable car according to claim 8, wherein the cable car control unit is configured to determine a correcting variable from the determined nominal value of the characteristic parameter of the electrical energy consumption for the at least one electrical consumer and an actual value of the characteristic parameter of the electrical energy consumption for the at least one electrical consumer determined for the at least one electrical consumer and to control or regulate the electrical energy consumption of the at least one electrical consumer based at least in part on the correcting variable.

10. The cable car according to claim 6, the people detection device further comprising at least one sensor unit configured for detecting a sensor variable in the access area and an evaluation unit configured for determining the characteristic variable of the crowd from the sensor variable.

11. The cable car according to claim 10, the sensor unit further comprising at least one of a camera, at least one light barrier, a microphone, a wireless local area network (WLAN), a radio-frequency identification (RFID) antenna, a pressure sensor, a scale, a movement sensor, a piezo sensor, an ultrasonic sensor, an infrared sensor, a $CO_2$ sensor, or a contact switch.

12. The cable car according to claim 6, the access area further comprising a boarding area for people to board the cable car vehicles and a waiting area for people to queue, and a ticket control barrier separating the boarding area and the waiting area, and wherein the people detection device is configured for determining the characteristic variable of the crowd in at least one of the boarding area or in the waiting area.

13. The cable car according to claim 6, wherein the characteristic variable of the crowd is at least one of a number of people, a volume, an area of the crowd, a pressure, a weight, a $CO_2$ concentration, or a number of sensor signals, and wherein a variable derived from the characteristic variable of the crowd is at least one of a time average value of the characteristic variable of the crowd or a change of the characteristic variable of the crowd over time.

14. A method of operating a cable car, wherein the cable car is configured according to claim 1, comprising the steps of:

predetermining a maximum value for an electrical energy consumption of the cable car;

determining a characteristic parameter of the electrical energy consumption of the cable car, and controlling or regulating an electrical energy consumption of at least one electrical consumer of the cable car with the cable car control unit based at least in part on the determined characteristic parameter of the electrical energy consumption of the cable car such that the predetermined maximum value for the electrical energy consumption for the cable car is not exceeded.

15. The method according to claim 14, further comprising the step of:

providing a people detection device in at least one cable car station of the cable car;

determining a characteristic variable of a crowd, continuously or intermittently, with the people detection device during the operation of the cable car; and controlling or regulating the electrical energy consumption of the at least one electrical consumer of the cable car with the cable car control unit based at least in part on the characteristic variable of the crowd determined at a fixed time or in a fixed period during the operation of the cable car.

16. A cable car network having a plurality of cable cars each having a number of cable car stations and a plurality of cable car vehicles movable between the cable car stations, comprising:

a cable car network control unit configured for controlling the cable car network;

a total energy determination unit configured for predetermining a characteristic parameter of a total electrical energy consumption of the cable car network, wherein a maximum value for the total energy consumption of the cable car network is predetermined; and wherein the cable car network control unit is configured to control or regulate the total electrical energy consumption of at least one cable car of the cable car network based at least in part on the characteristic parameter of the determined total electrical energy consumption such that the predetermined maximum value for the total electrical energy consumption of the cable car network is not exceeded.

17. The cable car network according to claim 16, wherein the cable car network control unit is configured for determining the maximum value for the electrical energy consumption for the at least one cable car from the maximum value for the total electrical energy consumption of the cable car network and to transmit the maximum value for the electrical energy consumption for the at least one cable car to the cable car control unit of the at least one cable car.

18. The cable car network according to claim 16, wherein the cable cars of the cable car network are connected to a common electrical energy source which determines the predetermined maximum value for the total electrical energy consumption of the cable car network, and/or wherein a sum of the maximum total electrical energy consumption of the cable cars is greater than the predetermined maximum value for the total electrical energy consumption of the cable car network.

19. The cable car network according to claim 16, wherein each of the plurality of cable cars has a prioritization value; and wherein the cable car network control unit is configured to control or regulate the electrical energy consumption of the cable cars based at least in part on the prioritization value of each of the plurality of cable cars.

20. A method of operating a cable car network, wherein the cable car network is configured according to claim 14, comprising the steps of:

providing a cable car network control unit to control the cable car network;

determining a total electrical energy consumption of the cable car network;

wherein a maximum value for a total electrical energy consumption of the cable car network is predetermined; and wherein the cable car network control unit controls an electrical energy consumption of at least one cable car of the cable car network such that the predetermined maximum value for the total electrical energy consumption of the cable car network is not exceeded.

* * * * *